J. Elliott. Tyre Shrinking Machine.

No. 73175

PATENTED JAN 7 1868

United States Patent Office.

JAMES ELLIOTT, OF MILFORD, WISCONSIN.

Letters Patent No. 73,175, dated January 7, 1868.

IMPROVEMENT IN TIRE-SHRINKING MACHINES.

*The Schedule referred to in these Letters Patent and making part of the same.*

TO ALL WHOM IT MAY CONCERN:

Be it known that I, JAMES ELLIOTT, of Milford, in the county Jefferson, and State of Wisconsin, have invented a new and improved Tire-Shrinking Machine; and I do hereby declare that the following is a full, clear, and exact description thereof, which will enable others skilled in the art to make and use the same, reference being had to the accompanying drawings, forming part of this specification.

This invention relates to a device for tire-shrinking, and consists of a platform and bed-piece, the latter supporting two sliding carriages carrying a notched or toothed flange, against which the tire to be shrunk is set, and held in place by two notched or ratchet-cam levers, mounted on the same carriages, which are pressed together by one or two other cam-levers, hung on vertical axes on the bed-piece, thus shrinking the tire. In the accompanying drawings—

Figure 1:
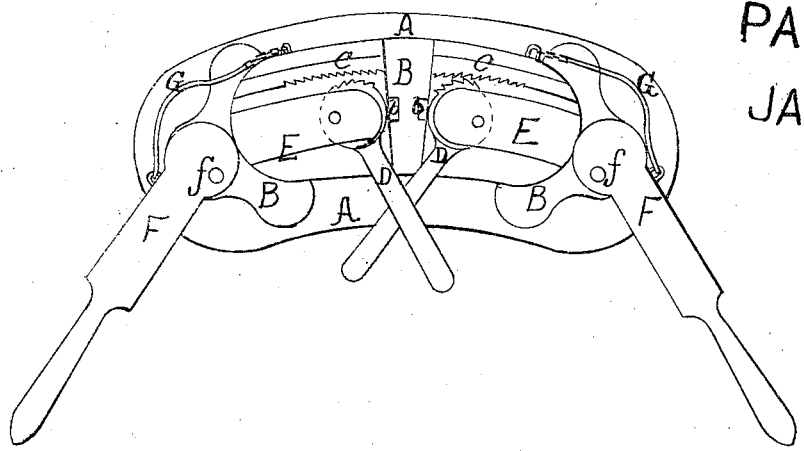

Figure 1 is a top view of my improved tire-shrinker, and

Figure 2:
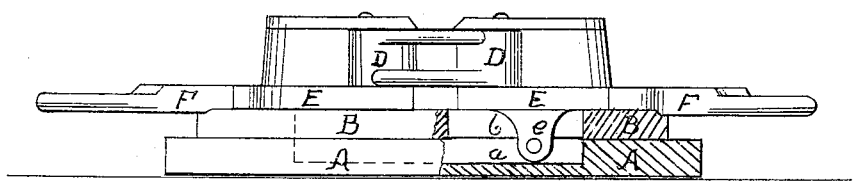

Figure 2 a front view thereof, with part of the platform removed to exhibit the manner in which one of the movable carriages runs.

Similar letters of reference indicate corresponding parts.

A A is the platform; B, the bed-piece; C, the flange, toothed or notched on the side against which the tire to be shrunk is placed; D D, two cam-levers, having toothed heads corresponding with the flange C. The flange C and levers D are borne on the sliding carriages E, which are drawn open by the rod or strap and chain G, attached to the levers F, or may be separated by a spring, and are pressed together by the cams F, hung on the vertical axes $f$. The carriages slide on the runners or T-shaped lugs $e$, in a slot, $b$, in the bed-piece B, and groove $a$ in the platform A, the slot $b$ and groove $a$ forming together a T-shaped groove to receive the runner or T-shaped lug $e$.

The tire to be shrunk is heated, the carriages opened, the tire placed against the flange C, and jammed by the cam-levers D, which for that purpose are forced into the position shown in the drawings. The carriages are then pressed together by forcing open the cam-levers F. For light work, one of the carriages may be made stationary by leaving one of the cam-levers F open, sliding only one carriage open before inserting the heated tire, the open carriage being then pressed towards the stationary one by the cam-lever F connected with it.

Having thus described my invention, what I claim as new, and desire to secure by Letters Patent, is—

1. The combination, of the connecting-rod or chain G for opening the carriages, with the carriage E and cam-levers F, substantially as described.

2. The slot $b$ in the bed-piece B, and the groove $a$ in the platform A, making together a T-shaped groove, in combination with a T-shaped lug upon the carriages, all as substantially specified and described.

JAMES ELLIOTT.

Witnesses:
JAMES ROSS,
JOSEPH TELYEA.